| United States Patent [19] | [11] Patent Number: 4,647,648 |
| Silvis et al. | [45] Date of Patent: Mar. 3, 1987 |

[54] POLYHYDROXYETHERS FROM HYDROXYBIPHENYLS

[75] Inventors: H. Craig Silvis, Midland, Mich.; Jody R. Berman, Lake Jackson, Tex.; Jerry E. White, Midland, Mich.

[73] Assignee: The Dow Chemical Company, Midland, Mich.

[21] Appl. No.: 768,988

[22] Filed: Aug. 26, 1985

[51] Int. Cl.$^4$ ............................................. C08G 59/02
[52] U.S. Cl. ..................................... 528/102; 528/104
[58] Field of Search ................................ 528/102, 104

[56] References Cited

U.S. PATENT DOCUMENTS

| 2,945,004 | 7/1960 | Greenlee | 528/104 X |
| 3,177,089 | 4/1965 | Marshall et al. | 528/104 X |
| 3,275,708 | 9/1966 | Bylsma | 528/104 X |
| 3,379,684 | 4/1968 | Wiesner et al. | 528/104 X |
| 3,787,520 | 1/1974 | Labana et al. | 528/108 |
| 4,383,101 | 5/1983 | Olsen et al. | 528/104 X |

*Primary Examiner*—Earl Nielsen

[57] ABSTRACT

Polyhydroxyethers formed by reacting a diglycidyl ether of biphenol, such as diglycidyl ethers of bisphenol-A, and a dihydroxybiphenyl, such as dihydroxybiphenyl, tetramethyldihydroxybiphenyl, and tetrabromotetramethyldihydroxybiphenyl, exhibit high heat distortion temperatures. These compositions could find utility in extruded films, packaging and coatings.

4 Claims, No Drawings

POLYHYDROXYETHERS FROM HYDROXYBIPHENYLS

FIELD OF THE INVENTION

This invention relates to polyhydroxyethers having improved heat distortion temperatures. These high molecular weight polyhydroxyethers are tough, thermoplastic materials which may find application in solution coatings or molded films.

BACKGROUND OF THE INVENTION

The reaction between aromatic diols and diglycidyl ethers is well established. In the articles entitled "Polyhydroxyethers. I. Effect of Structure on Properties of High Molecular Weight Polymers from Dihydric Phenols and Epichlorohydrin", the authors, Reinking, Barnabeo, and Hale, discuss the polyhydroxyether of bisphenol-A. (*Journal of Applied Polymer Science*, Vol. 7, pp. 2135–2144, 1963). The ether is formed by reacting bisphenol-A with epichlorohydrin to yield the polyhydroxyether of bisphenol-A with the following repeating unit:

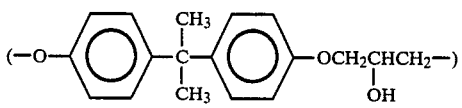

The article also discusses the use of connecting groups other than isopropenyl in the bisphenol and their effect on the glass transition temperature of the polyhydroxyethers. Such groups include

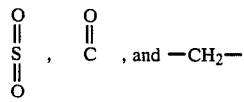

to name a few.

The polyhydroxyether of bisphenol-A has a much higher molecular weight than commercial epoxy coatings resins, 45,000 versus a maximum of about 8,000. It also does not contain the terminal epoxide functionality so the polymer is thermally stable and can be fabricated by conventional thermoforming techniques. However, the present invention allows for polyhydroxyethers to achieve a molecular weight of greater than 100,000 and improved heat distortion temperatures. Specifically, the heat distortion temperature of the polyhydroxyether of bisphenol-A is 88° C. at 264 psi. The present invention allows for heat distortion temperatures of greater than the boiling point of water. The present invention also eliminates the need for the crosslinking groups.

U.S. Pat. Nos. 2,698,315 and 4,072,656 disclose polyhydroxyethers prepared by reacting dihydroxybiphenol or tetramethyldihydroxybiphenol, respectively, with epichlorohydrin. Though these crosslinked products possess improved heat distortion temperatures relative to their bisphenol-A analogs, they have low molecular weights as compared to that of the present invention.

It has been discovered in accordance with this invention that when certain diglycidyl ethers are reacted with biphenols, high molecular weight polyhydroxyethers with higher heat distortion temperatures are formed. It is thus an object of this invention to provide such polyhydroxyethers for use in thermoforming processes such as extruded films, packaging, and coatings.

SUMMARY OF THE INVENTION

The present invention relates to a polyhydroxyether composition comprising a reaction product of diglycidyl ether of a biphenol with a dihydroxybiphenyl, in which the repeating unit of the polyhydroxyether contains a hydrocarbon connecting group and a hydrocarbon or halogen substituted phenylene radical.

DETAILED DESCRIPTION OF THE INVENTION

Any diglycidyl ether of a biphenol may be employed for the purposes of this invention. It is preferred, however, that the diglycidyl ether of the biphenol have the general formula

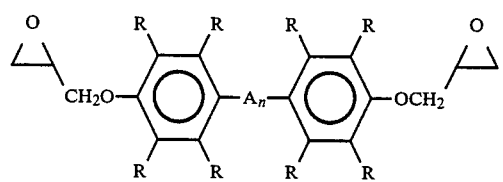

wherein R is selected from the group consisting of hydrogen, hydrocarbon radicals, halogen radicals, and mixtures thereof, A is a hydrocarbon radical and n has a value of zero to 1. It is further preferred that the diglycidyl ether of the biphenol be selected from the group consisting of

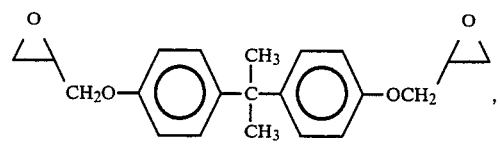

commonly known as the diglycidyl ether of bisphenol-A,

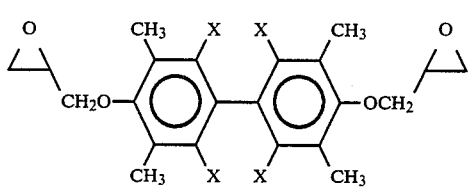

wherein X is selected from the group consisting of the hydrogen, chlorine, and bromine radical, and mixtures thereof, and, DER ®542, manufactured by The Dow Chemical Company, having the general formula

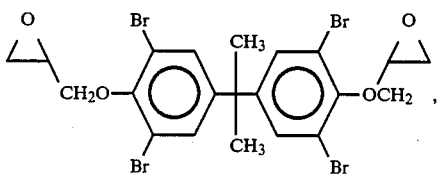

and mixtures thereof.

Any dihydroxybiphenyl, i.e., those having no connecting group, may be used for the purposes of this invention. Preferably the dihydroxybiphenyl is selected from the group consisting of unsubstituted dihydroxybiphenyl, tetramethyldihydroxybiphenyl, halogenated tetramethyldihydroxybiphenyl, and mixtures thereof. Thus, the preferred embodiment of the dihydroxybiphenyl of the present invention has the general formal

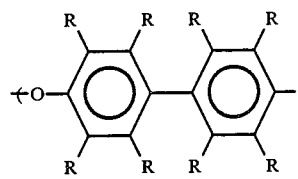

wherein R is selected from the group consisting of hydrogen, hydrocarbon radicals, halogen radicals, and mixtures thereof. Specifically, it is preferred that the dihydroxybiphenyl have the general formula

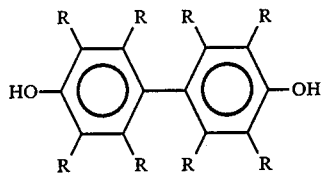

wherein X is selected from the group consisting of hydrogen and bromine radical.

The resulting polyhydroxyether has the following general repeating unit, which contains at least a hydrocarbon connecting group and a hydrocarbon or halogen substituted phenylene radical:

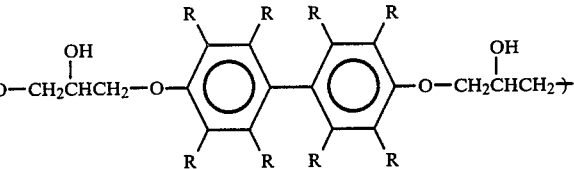

wherein R is selected from the group consisting of hydrogen, hydrocarbon radicals, halogen radicals, and mixtures thereof, A is a hydrocarbon radical, and n has a value of zero to 1. Examples of suitable hydrocarbon radicals include alkyl radicals such as methyl, ethyl, isopropyl or butyl radicals; alkenyl radicals such as vinyl and allyl radicals; aryl radicals such as phenyl, naphthyl, and biphenyl radicals; and corresponding substituted hydrocarbon radicals such as chlorobutyl or nitromethyl radicals. Examples of suitable halogen radicals include chlorine and bromine. It is believed the substituents on the phenylene radicals do not have to be identical for the purposes of this invention. The preceding example of the polyhydroxyether is given by way of illustration and not by way of limitation.

It is therefore preferred that the polyhydroxyether have the general repeating unit, but which must contain either a hydrocarbon connecting group or a hydrocarbon or halogen substituted phenyl radical:

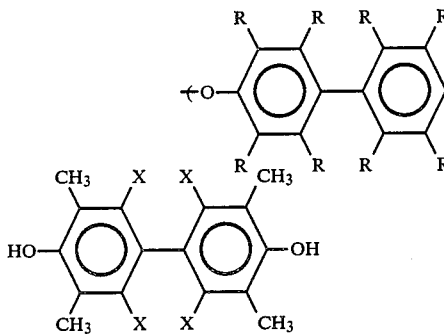

wherein R is selected from the group consisting of hydrogen, methyl, halogen radicals selected from the group consisting of chlorine radicals, bromine radicals and mixtures thereof, A is an isopropyl radical, and n has a value of zero to 1. Specifically, the polyhydroxyethers which are most preferred for the purposes of this invention have the general repeating units selected from the group consisting of:

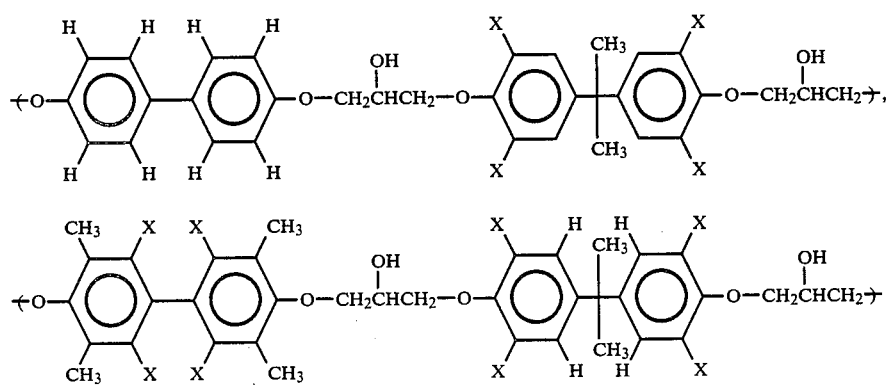

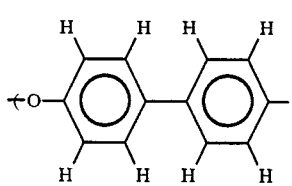
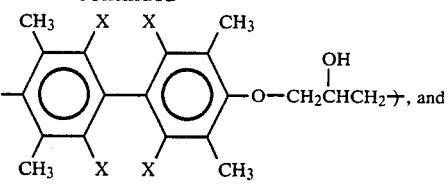

-continued

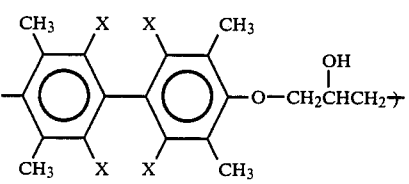

wherein X is selected from the group consisting of the hydrogen, chlorine, bromine radicals, and mixtures thereof.

Fractionation of the polyhydroxyether is required to obtain optimal molecular weights. Fractionation may be carried out in any solvent which gives the desired results. Suitable solvents include methanol and ethanol. A linear, high molecular weight resulting polyhydroxyether is optimal.

The reaction between the diglycidyl ether and the biphenol to form the polyhydroxyether is carried out via a solution process. So far as is known at this time, any solution process is feasible. It appears suitable solvents are those which are polar in nature and substantially inert in a basic medium. Examples of suitable solutions include dioxanes, dimethyl acetamide, methyl isobutyl ketone, methyl ethyl ketone, N-methylpyrrolidinone, methyl ethers and ethanol. These examples, however, are given by way of illustration only, and not by way of limitation. It is preferred, however, that the solution be hot and be selected from the group consisting of 2-ethoxyethanol, p-dioxane, and mixtures thereof. Other preferred solvents include dipropyleneglycol methyl ethers, 2-butoxyethanol, and N-methylpyrrolidinone. Use of such solvents aid in controlling reaction exotherm which shortens catalyst lifetime and promotes branching. In the preparation of the polyhydroxyethers, a 2 mole percent excess of the diglycidyl ether is required to obtain optimal molecular weights, to compensate for a competing side reaction that consumes epoxide. The slight excess allows the diol and the epoxide to remain stoichiometrically equivalent during the latter stages of the reaction.

The polyhydroxyethers of the present invention have been found to be useful in thermoforming processes such as extruded films, packaging, and coatings. The polyhydroxyethers may find use in the manufacture of articles such as combs, brush handles, garden furniture, radio cabinet parts, structural parts requiring high heat distortion temperatures, insulation of electrical parts, and protective coatings. The compositions may be cast or molded using simple procedures. These compositions are particularly useful in making high temperature structural parts for the aircraft industry, and tools and dies such as those used in the automobile industry for stamping fenders, hoods and other automobile body parts. The compositions may also find use as adhesives. If needed, fillers may be added.

Now, in order that those skilled in the art may better understand how the present invention can be practiced, the following example is given by way of illustration and not by way of limitation.

EXAMPLES 1-3

Polymerization reactions were carried out in 50, 100, or 5000 ml glass resin kettles equipped with a mechanical stirrer. All reactants were weighed directly into the reaction vessel.

Bisphenol-A was obtained from Aldrich Chemical Company and was recrystallized from toluene. Dihydroxybiphenyl (DHBP) and tetramethyldihydroxybiphenyl (TMDHBP) were recrystallized from isopropanol/heptane and toluene, respectively.

The purification of the diglycidyl ethers had a significant effect on the molecular weight of the resulting polymers. The reaction between DHBP and DER ®332 resulted in a polymer with a molecular weight of 103,000 when a purified ether was employed, but only a molecular weight of 48,000 when an unpurified ether was used. The reaction between TMDHBP and the diglycidyl ether of DHBP resulted in a polymer with a molecular weight of 66,000 when the ether was purified to its theoretical epoxide equivalent weight of 149, but a molecular weight of 43,000 resulted when the ether's epoxide equivalent weight was at 158. Presumably, the differences between the molecular weights was due to impurities in the ether, such as chlorohydrin and hydrolyzed epoxide, which are monofunctional in nature.

The epoxide analysis of Jay was used to analyze the diglycidyl ethers. (Jay, R. R., Anal. Chem., 36, 667, (1964)). Generally, this method involved the in situ generation of hydrogen bromide, which reacted with the epoxide to yield the halohydrin. The epoxide and excess $Et_4NBr$, in glacial acetic acid/chloroform, were titrated with $HClO_4$ in glacial acetic acid. The titrant solution was freshly prepared before each analysis and standardized against dry potassium hydrogen phthalate, primary standard. Blanks were also titrated. Crystal violet was used as the indicator; the end point being a blue-green color. The epoxide equivalent weight, EEW, for a pure diglycidyl ether, is its molecular weight divided by 2.

The diglycidyl ether of bisphenol-A employed was DER ®332 manufactured by The Dow Chemical Company. To purify the waxy solid, the material was ground into a fine white powder in methanol, filtered, and then recrystallized from methanol by cooling a room temperature saturated solution to approximately −25° C. overnight. After filtration and drying, the recovery of crystalline material was about 60–70 percent. The melting point of this material was 33°–34° C. The ¹H NMR spectrum of the material in CDCl₃ deuterated chloroform with a TMS reference gave the following analysis: δ1.55 (s, 6H, C(CH₃)₂),

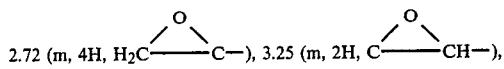
2.72 (m, 4H, H₂C—C—), 3.25 (m, 2H, C—CH—), 4.00 (m, 4H, C—CH₂—O), 7.02 (q, AA'BB', 8H, Ar). Epoxide analysis of the material gave an EEW of 170, which is also its theoretical EEW.

The diglycidyl ether of DHBP, prior to recrystallization, had an EEW of 167. The crude material was recrystallized from acetone. The crystalline solid had an EEW of 156. The material was vacuum distilled in a sublimation apparatus at about 180° C., followed by a second recrystallization. Final recovery was approximately 30–40 percent. The material had a melting point of 165°–165.5° C. The ¹H NMR spectrum of the material in CDCl₃, with a TMS reference, analyzed the material as follows:

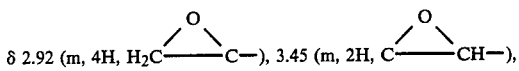
δ 2.92 (m, 4H, H₂C—C—), 3.45 (m, 2H, C—CH—), 4.15 (m, 4H, C—CH₂—O), 7.30 (q, AA'BB', 8H, Ar). Epoxide analysis of the material gave an EEW of 149, identical to the theoretical value.

To prepare the diglycidyl ether of TMDHBP, 16.6 grams (g) (0.308 mmol) of NaOMe was added to about 200 ml of absolute ethanol. The resulting solution was degassed by repeated evacuation and flushing with dry nitrogen gas. Addition of 35.5 g (0.146 mmol) of TMDHBP, followed by degassing, gave a deep green solution which was immediately added to excess epichlorohydrin (170 ml, 2.20 mol) via a 14 gauge cannulae. The reaction solution became light yellow with concomitant precipitation of sodium chloride upon stirring overnight. The salt was filtered off and the filtrate was evaporated to dryness on a rotary evaporator. The resulting yellow oil crystallized upon standing. The crude product was recrystallized from isopropanol/hexane and, after drying, gave an EEW of 185. Purer material of the crude product could be obtained by vacuum distillation at about 160° C., followed by recrystallization from isopropanol/hexane. Titration of this material gave an EEW of 181, compared to a theoretical value of 177. The melting point of this material was 110°–111° C. The ¹H NMR spectrum of the material in deuterated chloroform (CDCl₃), with a TMS reference, gave the following results: δ 2.38 (s, 12H, CH₃Ar),

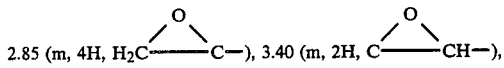
2.85 (m, 4H, H₂C—C—), 3.40 (m, 2H, C—CH—), 3.94 (m, 4H, C—CH₂—O), 7.20 (s, 4H, Ar).

A 2 mole percent excess of diglycidyl ether was employed in order to compensate for a competing side reaction that consumes epoxide. A slight excess of epoxide was required so that the diol and the epoxide remained stoichiometrically equivalent during the latter stages of the reaction. Otherwise, the intermediate alkoxide formed during the reaction would react with epoxide and yield a branched polymer rather than deprotonating the diol to continue propagation.

Butyltriphenylphosphonium bicarbonate, BuP(C₆H₅)₃⁺HCO₃⁻, was used as a catalyst at a 6–8 meq/eq of the diglycidyl ether level. The bicarbonate catalyst is the preferred catalyst for the reaction of the present invention. The bicarbonate catalyst can be readily prepared via ion exchange or metathesis routes. Ethyltriphenylphosphonium bicarbonate, ethyltriphenylphosphonium acetate, and tetrabutylphosphonium acetate may also be employed as a catalyst. Any catalyst, though, which gives polyhydroxyethers with the desired properties is feasible.

Dowanol ®EE (2-ethoxyethanol), Dowanol ®DPM (dipropylene glycol methylether), and Dowanol ®EB (2-butoxyethanol), all manufactured by The Dow Chemical Company, or Dowanol ®EE/p-dioxane mixtures were used as polymerization solvents at a level of about 40 weight percent. Dowanol EE was distilled from potassium carbonate. p-Dioxane was distilled from LiAlH₄ and stored under N₂. Use of such solvents aided in controlling the reaction exotherm which shortened catalyst lifetime and promoted branching.

Polymerization temperatures were maintained at about 130°–140° C. for 6–7 hours, despite the fact that, qualitatively, little increase in reaction solution viscosity was observed after 3–4 hours at a reflux temperature of about 135° C. Reaction viscosity build-up was compensated by the addition of 1–2 ml aliquots of solvent. Solvents in which the polymers were soluble include tetrahydrofuran, acetone, and chloroform.

After reaction was completed, the polymer solution was diluted with tetrahydrofuran and rapidly added to excess methanol to precipitate the polymer. The material was kneaded with a Teflon rod under methanol, and then redissolved in tetrahydrofuran and reprecipitated two additional times, with a net yield of the polymer of about 90 percent in all cases. The filtrate remaining after the final precipitation was relatively clear, indicating that the bulk of low molecular weight material had been removed. A gel permeation chromatographic molecular weight, relative to polystyrene standards, of fractionated versus unfractionated polymers supported this view. The molecular weight of the polyhydroxyether formed by reacting DER ®332 with DHBP was 59,000 when the polymer was unfractionated, but 66,000 when fractionated.

The final product was vacuum dried at about 60° C. overnight, ground up in methanol using a Waring Blender or a Wiley Mill, and then redried in vacuo at 140°–160° C. for about 24 hours. The polymer was then analyzed via thermal gravimetrics to determine if all the solvent was removed.

Specifically, the following tables summarize the reactions studied and the properties of the resulting polymers. The reaction between bisphenol-A and its ether was studied for comparative purposes only. The abbreviations employed in the following tables consist of Me for methyl, DGE for diglycidyl ether, HDT for heat distortion temperature (Vicat), Tg for glass transition temperature (DSC), DHBP for dihydroxybiphenyl, TMDHBP for tetramethyldihydroxybiphenyl, Bis-A for Bisphenol-A, Mw for weight average molecular weight, and Mn for number average molecular weight. The molecular weights were determined by gel permeation chromatography relative to polystyrene standards. Glass transition temperatures were determined by differential scanning calorimetry using a Mettler TA3000 instrument.

tion. Examples 11-13 were prepared from unpurified reactants.

TABLE I

|  | Comparative A-DGE of Bis-A Reacted with Bis-A | Example 1-DGE of Bis-A Reacted with DHBP | Example 2-DGE of Bis-A Reacted with DHBP | Example 3-DGE of Bis-A Reacted with TMDHBP |
| --- | --- | --- | --- | --- |
| $\overline{Mw}$ relative to PS standards | ~120,000 | ~100,000 | ~50,000 | ~100,000 |
| HDT, (Vicat), °C. | 104 | 112 | 107 | 122 |
| Tg (DSC), °C. | 98 | 109 | 105 | 118 |
| Tensile (yield), psi | 9,000 | 8,200 | 8,500 | 8,500 |
| (% elongation) | (5) | (8) | (7) | (5) |
| Tensile (break), psi | 7,500 | 7,200 | 8,000 | 7,300 |
| (% elongation) | (6) | (65) | (9) | (8) |
| Modulus, psi × $10^{-5}$ | 2.7 | 2.5 | 2.9 | 3.2 |
| Izod Impact, ft-lb/inch of notch | 3 | 22 | 1 | 2 |
| Yield, percent | — | ~90 | ~90 | ~90 |
| Comments | — | Solvent: Dowanol EE | Unpurified reactants; solvent-Dowanol EE one precipitation of polymer | Solvent-Dowanol EE |

TABLE II

Physical Data on Polyhydroxyethers

| Example | Diol | DGE | Solvent | Ether/Diol | Yield, % | $\overline{Mw} \times 10^{-4}$ | $\overline{Mw}/\overline{Mn}$ | $T_g$, °C. | HDT, °C. (Vicat) |
| --- | --- | --- | --- | --- | --- | --- | --- | --- | --- |
| 4 | DHBP | Bis-A | Dowanol EE | 1.00 | 93 | 7.3 | 1.85 | 107 | — |
| 5 | DHBP | Bis-A | Dowanol EE | 1.02 | 91 | 10.3 | 1.94 | 109 | 113 |
| 6 | TMDHBP | Bis-A | Dowanol EE | 1.02 | 92 | 9.8 | 2.15 | 119 | 125 |
| 7 | DHBP | Bis-A | Dowanol EE | 1.02 | 88 | 11.5 | 2.23 | 109 | 112 |
| 8 | TMDHBP | Bis-A | Dowanol EE | 1.02 | 91 | 11.4 | 2.54 | 118 | 122 |
| 9 | TMDHBP | DHBP | Dowanol EE/p-Dioxane | 1.02 | 83 | 6.6 | 2.00 | 128 | — |
| 10 | TMDHBP | TMDHBP | Dowanol EE/p-Dioxane | 1.02 | 50 | 4.5 | 2.13 | 127 | — |
| 11 | DHBP | Bis-A | Dowanol EE | 1.02 | 83 | 6.6 | 2.33 | 107 | — |
| 12 | DHBP | Bis-A | Dowanol EE | 1.02 | 91 | 5.9 | 2.19 | 105 | 107 |
| 13 | TMDHBP | Bis-A | Dowanol EE | 1.02 | 91 | 5.4 | 2.37 | 113 | — |

The polymer resulting from the reaction between DHBP and purified DER ®332 displayed a higher $T_g$, HDT and impact strength than its bisphenol-A counterpart (Comparative A versus Example 1). The other properties of this polymer were characteristic of a tough, thermoplastic resin. Indeed, the Izod impact strength of the polymer was higher than that of a polycarbonate.

When the DHBP polymer was prepared from impure starting materials (Example 2) and given only one precipitation, the $T_g$ and HDT were lower due to a lower average molecular weight and plasticization by low molecular weight fragments.

The reaction between tetramethyldihydroxybiphenol and purified DER ®332 (Example 3) exhibited nearly a 20° C. increase in $T_g$ and HDT relative to the polyhydroxyether of bisphenol-A.

Thermogravimetric analyses of polymers prepared with the DER ®332 demonstrated that initial weight loss begins at about 320° C., indicating that these materials could likely be processed by conventional extrusion and injection methods. Gel permeation chromatography of polymers before and after compression molding at 200° C. indicated no change in molecular weight due to thermal degradation.

Table II reports the data showing good $T_g$ results obtained for additional examples of the present inven- The following examples illustrate the preparation of halogenated polyhydroxyethers.

EXAMPLE 14

To a 1000 ml resin kettle equipped with overhead stirring were added 80.02 g of tetrabromotetramethylbiphenol, 50.03 g bisphenol-A/diglycidyl ether (derived from DER ®332 epoxy resin) and 0.5 g butyltriphenylphosphonium bicarbonate. These solids were combined with 80 ml of Dowanol ®EB and the mixture was heated to about 170° C. with constant stirring and slow nitrogen purge. At reaction temperature, all reactants were in solution. Viscosity build-up was observed after about 45 minutes. The reaction was allowed to proceed for about 6 hours with additions of solvent (10 ml aliquots) to compensate for viscosity build-up. The reaction solution was then partially cooled down to about 80° C. and 200 ml tetrahydrofuran was added. This was allowed to stir overnight and then the polymer solution was added to about one liter of methanol. The precipitated white polymer was redissolved in tetrahydrofuran and reprecipitated in methanol two additional times. After air drying, the material was dried overnight at about 80° C. in vacuo. The resulting foam was ground up in a Wiley mill and then redryed in vacuo for 24 hours at about 170° C. The repeating unit of the polymer was

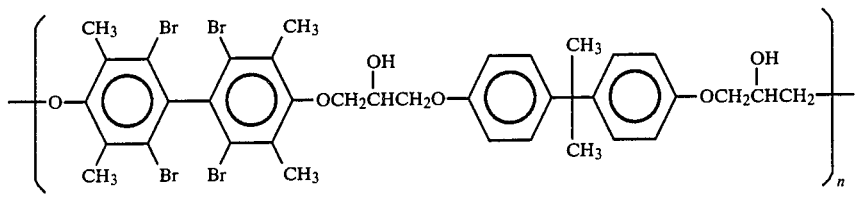

The polymer properties tested are reported in Table II.

TABLE II

| Property | Value |
| --- | --- |
| $T_g$ | 161° C. |
| $\overline{Mw}$ (rel. to polystyrene standards) | ~60,000 |
| $\overline{Mw}/\overline{Mn}$ | 1.96 |
| Tensile Strength (yield) | 9,800 psi |
| Elongation (yield) | 7.1% |
| Tensile strength (break) | 9,200 psi |
| Elongation | 9.5% |
| Modulus | $3.3 \times 10^5$ psi |
| Izod impact strength (notched) | 1.2 ft-lb/in |

EXAMPLE 15

To a 100 ml resin kettle equipped with overhead stirring and nitrogen purge, 4.807 g of tribromotetramethylbiphenol, 3.581 g of bisphenol A diglycidyl ether (DER®332), 50 mg of ethyltriphenylphosphonium acetate catalyst, and about 8 ml of Dowanol®DPM solvent was added.

The reaction mixture was heated with constant stirring to about 180° C., at which point the viscosity began to increase rapidly. Further additions of solvent compensated for the viscosity increase during the reaction. After about a 4 hour reaction time, the reaction solution was cooled and diluted with about 30 ml of tetrahydrofuran.

The polymer was simultaneously precipitated and ground up by the addition of the tetrahydrofuran solution to excess methanol in a Waring® blender. After filtration and vacuum drying, the yield of the polymer was 6.6 g or 79 percent. The weight-average molecular weight of the polymer was 70,397; the ratio of the weight-average molecular weight to the number-average molecular weight was 2.11; and the glass transition temperature was 157° C. The repeating unit of the polymer had the general formula:

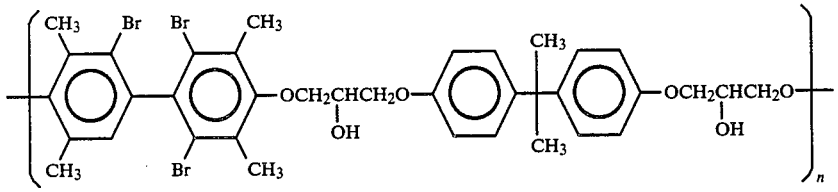

EXAMPLE 16

To a 100 ml resin kettle equipped with overhead stirring and nitrogen purge, 5.069 g of tetrabromotetramethylbiphenol, 6.213 g of tetrabromotetramethylbiphenol diglycidyl ether, 50 mg of ethyltriphenylphosphonium acetate catalyst, and about 10 ml of distilled N-methylpyrrolidinone solvent was added.

The reaction mixture was heated with constant stirring to about 180° C., at which point the viscosity began to increase rapidly. Further addition of solvent was used to compensate for the increased viscosity during the reaction.

After about 6 hours of reaction, the mixture was cooled and the polymer solution diluted with about 30 ml of tetrahydrofuran. The polymer was then precipitated by addition to an excess of methanol. After standing in methanol for about 2 hours, the precipitated polymer was air-dried, redissolved in tetrahydrofuran, and reprecipitated in methanol. After grinding, filtering, and vacuum drying, the yield of polymer was 9.5 g of 84 percent. The weight-average molecular weight of the polymer was 38,245; the ratio of the weight-average molecular weight to the number-average molecular weight of the polymer was 2.20; and the glass transition temperature of the polymer was 231° C.

The repeating unit of the polymer of the present example had the general formula:

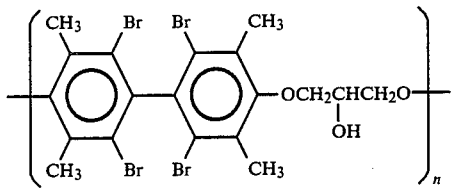

EXAMPLE 17

The diglycidyl ether of tetramethyltetrabromobiphenol, employed in the present example, was prepared via the caustic coupling procedure. During the caustic addition, $CH_2Cl_2$ had to be added to dissolve the precipitating product. The resulting ether had an epoxide content of 10.7 percent and a theoretical epoxide content of 12.8 percent.

The tetramethyltetrabromobiphenol thermoplastic of the present example was prepared by mixing 10.05 g (0.025 equivalent) of the above diglycidyl ether with 6.84 g (0.0245 equivalents) of tetramethyltetrabromobiphenol at 200° C. At 175° C. the phenolic would not dissolve.

A 70 percent solution of tetrabutylphosphonium acetate.acetic acid in methanol was then added to mixture in the amount of 0.054 g or 4 meq/eq of epoxy. In approximately 5 minutes, the clear solution turned opaque. The mixture was reacted for 4 hours at 200° C.

The solid product gave a 225° C. glass transition temperature with no indication of decomposition at 325° C.

EXAMPLE 18

Example 5 was repeated employing a 11.08 g (0.025 eqs) of diglycidyl ether of tetramethyltetrabromobiphenol with an epoxide content of 9.7 percent.

The resulting thermoplastic had a glass transition temperature range of 174° to 230° C.

EXAMPLE 19

The tetramethyltetrabromobiphenol thermoplastic of the present invention was prepared by mixing 6.72 g (0.02 eqs) of the diglycidyl ether of tetrabromobisphenol A (DER ®542, manufactured by The Dow Chemical Company) with 5.46 g (0.0196 eqs) of tetramethyltetrabromobiphenol at 175° C. until homogeneous. Then, 0.043 g of a 70 percent solution of tetrabutylphosphonium acetate.acetic acid in methanol was added, and the mixture was heated for 4 hours at 175° C. The solid product had a glass transition temperature of 171.8° C.

EXAMPLE 20

The tetramethyltribromodiglycidyl ether, employed in the present example, was prepared by dissolving 239.5 g (1.0 eqs) of tetramethyltribromobiphenol in 462.5 g (5.0 eqs) of epichlorohydrin, 249 g of isopropanol, and 40.2 g of water. At 60° C., 180 g of 20 percent aqueous caustic was slowly added over 45-60 minutes. After 15 minutes of digestion at 60° C., the aqueous layer was separated, and an additional 80 g of 20 percent aqueous caustic was added over the next 30 to 45 minutes. After water washing, the excess epichlorohydrin and solvent was vacuum stripped to yield the diglycidyl ether product with a 13.85 percent actual epoxide content and a 14.55 percent theoretical epoxide content.

To prepare the tetramethyltribromobiphenol thermoplastic of the present example, 7.0 g (0.0225 eqs) of the above prepared diglycidyl ether was mixed with 5.29 g (0.022 eqs) of tetramethyltribromobiphenol, and 4 meq/eq of epoxide of a 70 percent solution of tetrabutylphosphonium acetate.acetic acid in methanol at 200° C. After reacting for 4 hours at 200° C., the thermoplastic had a glass transition temperature of 180° C., with a large exotherm beginning at 200° C.

EXAMPLE 21

The tetramethyltribromobiphenol thermoplastic of the present example was prepared by mixing, 7.0 g (0.0208 eqs) of the diglycidyl ether of tetrabromobisphenol A (DER ®542, manufactured by The Dow Chemical Company) with 4.89 g (0.0204 eqs) of tetramethyltribromobiphenol, at 200° C. until homogeneous. Then, 4 meqs/eq of epoxide of a 70 percent solution of tetrabutylphosphonium acetate.acetic acid in methanol was added and the solution was reacted for 4 hours at 200° C. The thermoplastic had a glass transition temperature of 156.6° C.

What is claimed is:

1. A polyhydroxyether composition comprising a reaction product of a diglycidyl ether of a biphenol selected from the group consisting of

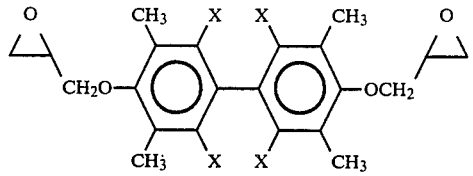

wherein X is selected from the group consisting of the hydrogen, chlorine, and bromine radicals, and mixtures thereof, and

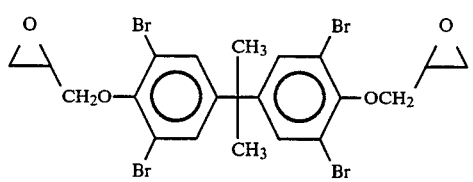

and mixtures thereof, with a dihydroxybiphenyl, in which the repeating unit of the polyhydroxyether contains at least an oxyhydrocarbon connecting group and a hydrocarbon or halogen substituted phenylene radical.

2. The polyhydroxyether of claim 1 wherein the polyhydroxyether has the general repeating unit

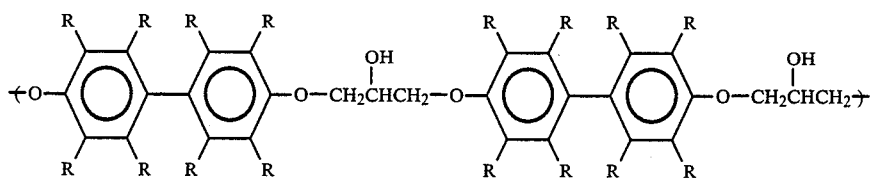

wherein R is selected from the group consisting of hydrogen, methyl radicals, halogen radicals selected from the group consisting of chlorine and bromine radicals, and mixtures thereof.

3. The polyhydroxyether of claim 1 wherein the dihydroxybiphenyl is selected from the group consisting of an unsubstituted dihydroxybiphenyl, tetramethyldihydroxybiphenyl, brominated tetramethyldihydroxybiphenyl, and mixtures thereof.

4. A composition as defined in claim 3 wherein the repeating unit of the polyhydroxyether is selected from the group consisting of

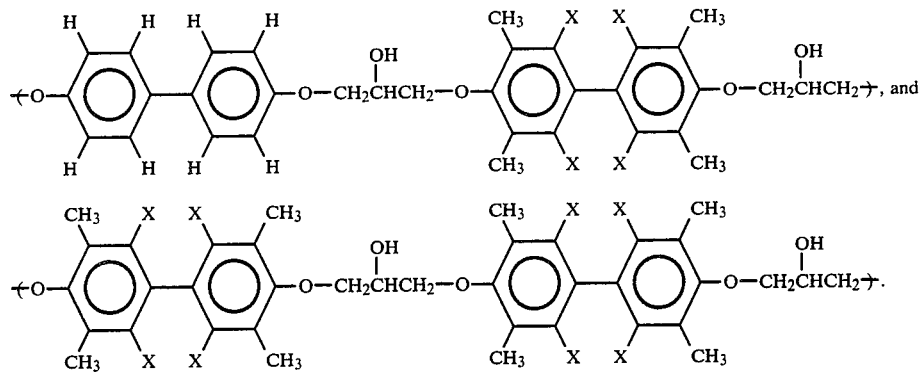
wherein X is selected from the group consisting of the hydrogen, chlorine and bromine radicals, and mixtures thereof.
* * * * *